3,051,236
TREATING UNDERGROUND FORMATIONS
Francis J. Mitch and Leo Landau, Houston, Tex., assignors to Texaco Inc., a corporation of Delaware
No Drawing. Filed Dec. 30, 1958, Ser. No. 783,660
6 Claims. (Cl. 166—30)

This invention relates to the treatment of permeable underground formations. More particularly, this invention relates to a method of treating permeable underground formations to reduce the porosity and/or permeability thereof. In accordance with one embodiment this invention is directed to the treatment of permeable underground formations to plug these formations. In accordance with another embodiment this invention is directed to a method of treating permeable underground formations to reduce the porosity and permeability of such formations, particularly water permeability. In accordance with yet another embodiment this invention is directed to a method of treating permeable underground formations to increase the relative oil-water permeability thereof.

It is known to treat permeable underground formations to render the same substantially impermeable. One practice employed heretofore has been to inject liquid cement into permeable formations, and then to permit the cement to set therein. A formation so treated is rendered substantially fluid impermeable. Another method practiced heretofore has been to inject into an underground permeable formation one treating solution, followed by another treating solution, and permitting the thus-introduced treating solutions to react with each other within the formation with the eventual deposition of solid materials therefrom, thereby reducing the porosity of or plugging the thus-treated formation.

Each of the foregoing methods of plugging or reducing the porosity and/or permeability of underground formations has some disadvantage. For example, it is difficult to inject liquid cement into relatively tight formations. Further, cement plugging is sometimes difficult to control. Also, the use of two treating solutions to plug a formation is not usually completely satisfactory due to a skin-plugging effect predominant at the interface of the treating solutions within the formation. Further, when two treating solutions are employed an intimate admixture of these solutions to insure a satisfactory and complete reaction upon the treating solutions within the formation undergoing treatment is difficult to obtain.

Accordingly it is an object of this invention to provide an improved method for treating permeable underground formations to reduce the porosity and water permeability thereof.

Still another object of this invention is to provide a method whereby a single, homogeneous treating solution is employed to plug or to effect at least a partial reduction in the porosity and water permeability of an underground formation.

Still another object of this invention is to provide a formation plugging method or a method for reducing the porosity of water-permeable formations wherein there is caused to be deposited within the pores or interstices of the formation a substantially oil-insoluble and water-insoluble solid material.

How these and other objects of this invention are accomplished will become apparent with reference to the accompanying disclosure. In at least one embodiment of the practice of this invention at least one of the foregoing objects will be obtained.

We have now discovered that an improved method of treating a permeable underground formation to reduce the porosity of the same is obtained by introducing into said formation a solution of a water-insoluble, and substantially oil-insoluble compound, such as diphenyl phthalate. Particularly suitable in the practice of this invention is a solution of diphenyl phthalate, preferably a saturated solution, in a suitable organic solvent such as an aliphatic ketone, for example acetone or an aliphatic alcohol such as ethanol, butanol, etc. In the practice of this invention a solution of diphenyl phthalate is introduced into an underground permeable formation and upon contact of the injected diphenyl phthalate solution with formation fluids therein, such as water, brine, diphenyl phthalate is precipitated and serves to reduce the porosity of and/or to plug that portion of the formation and to reduce the water permeability thereof. It is an outstanding feature of this invention that the treating solution containing a water-insoluble substantially oil-insoluble solute (diphenyl phthalate) does not release a plugging precipitate in a sand back-flowing a substantial amount of oil with some water. Further the treating solution of this invention will precipitate a solute plug when the solution encounters a sand or formation back-flowing a substantial amount of water with or without some oil.

Although other substantially oil-insoluble, water-insoluble materials may be employed in the practice of this invention diphenyl phthalate has been found to be particularly satisfactory.

Any suitable solvent may be employed to dissolve the substantially oil-insoluble, water-insoluble treating agent, namely diphenyl phthalate, employed in the practice of this invention. Particularly suitable solvents include acetone, methyl ethyl ketone, methyl propyl ketone and others.

As indicated hereinabove, it is preferred in the practice of this invention to employ saturated solutions of the oil-insoluble, water-insoluble treating agent. By employing saturated solutions, particularly saturated solutions at a relatively elevated temperature, such as a temperature in the range 70–150° F., more or less, depending upon the solvent employed, an increased amount of treating agent may be introduced into the formation undergoing treatment per volume of treating solution, thereby effecting a more complete plugging or treatment of the formation per volume of treating solution.

Various formations are suitably treated in accordance with the practice of this invention to alter or reduce the porosity and/or permeability thereof to water. Formations which are suitably treated include water-producing formations and oil-water-producing formations. The practice of this invention is particularly suitable for the treatment of water-producing formations to reduce the water permeability thereof and for the treatment of oil-producing formations which concomitantly produce water or formation brine. In accordance with one embodiment the practice of this invention is applicable to reduce or avoid water coning such as sometimes arises when an oil-producing formation is produced at a location adjacent or close to a water-producing formation and wherein during the production of oil, water in excessive amounts is also produced. In a treatment in accordance with the practice of this invention to inhibit or eliminate water coning there is introduced into the oil-producing formation at or near the zone of oil production, or into the water-producing formation itself, from which water coning arises, a suitable amount of the treating solution of this invention, such as a substantially saturated solution of diphenyl phthalate and acetone, in an amount to substantially reduce the water permeability of that portion of the formation into which the treating solution has been injected. Usually an amount of treating solution sufficient to treat the formation for a distance 5–100 radial feet, more or less, from the point or area of injection is sufficient.

In accordance with another embodiment of the practice of this invention satisfactory results are obtainable when the treating solution of this invention has incorporated or added thereto, prior to, during or after injection, oil in a substantial minor or a major amount, such as an amount in the range 5–75% by vol. based on the resulting total treating fluid.

In accordance with yet another embodiment of the practice of this invention a relatively hot saturated or super-saturated treating solution, such as a solution of diphenyl phthalate in a suitable organic solvent at a temperature in excess of 100° F., such as a temperature in the range 150–400° F., is introduced into a permeable underground formation to be treated. Upon introduction of the hot treating solution into the relatively cold formation the solution becomes cooled with the resultant precipitation of the water-insoluble, substantially oil-insoluble solute, diphenyl phthalate. The resulting deposited solid solute serves to reduce the porosity and/or permeability of the thus-treated formation at that portion thereof wherein the treating solution is injected.

The following examples are illustrative of the practice of this invention.

*Example No. I*

In tests simulating treatment of a producing well two injections were made into a brine saturated sand pack having an initial $K_w$ of 5.7 darcys at 90° F. Each injection consisted of a 50 cc. solution in which there were about 30 gm. of diphenyl phthalate. Six days after the first injection the $K_w$ was 3.59 darcys, a water permeability reduction of about 37%. Eight days after the second injection, after fluid flow through the treated sand pack became constant, the $K_w$ or water permeability had been reduced to 1.85 darcys, a total reduction in water permeability as a result of these two treatments of 67.5%.

In another test simulating treatment of an injection well 50 cc. of a solution of diphenyl phthalate in acetone were injected into a sand pack in which the oil saturation $S_o$ was 23% and the water saturation $S_w$ was 77% and which had an effective water permeability $K_w$ of 2.9 darcys at 90° F. After the injection a continuous reduction in water permeability was observed, resulting in a water permeability of the thus-treated sand pack of 0.44 darcys, a water permeability reduction of 86%.

As a result of these tests it was observed that the treating solution comprising diphenyl phthalate and acetone was more effective in the reduction of water permeability wherein the sand pack contained a minor oil content, below about 30% saturation, than when the sand pack was saturated 100% with water.

*Example No. II*

A fluid-flow, permeability cell having the characteristics set forth in accompanying Table No. 1 was employed in these tests.

TABLE NO. 1

| | | |
|---|---|---|
| Cell length | cm | 37.5 |
| Cell diameter | cm | 3.3 |
| Area | cm. sq. | 8.5 |
| Bulk vol. | cc | 320.25 |
| Pore vol. | cc | 101 |
| $S_o$ (oil saturation) | percent | 87 |
| $S_w$ (water saturation) | do | 13 |
| Oil permeability $K_o$ | darcys | 5.92 |

Into the cell were injected 50 cc. of a saturated diphenyl phthalate solution at a temperature of 100° F. After the injections oil was backflowed through the cell with the following results.

After the first injection of 50 cc. of the treating solution it was observed that the oil permeability was reduced to 5.89 darcys, a reduction of 0.507%. After the second injection it was observed that the oil permeability was reduced to 4.75 darcys, a total or cumulative reduction in oil permeability of 19.76%.

*Example No. III*

Additional tests were carried out on a sand pack having the following characteristics:

| | | |
|---|---|---|
| Length | cm | 36.5 |
| Area | cm. sq. | 8.81 |
| Bulk vol. | cc | 322.2 |
| Temperature | ° F | 100 |
| Pore vol. | cc | 121.7 |
| Porosity | percent | 37 |
| $S_w$ | do | 100 |

The results observed in these tests wherein a treating solution of diphenyl phthalate in an acetone-crude oil mixture was employed (21.3 gm. of diphenyl phthalate per 50 cc. of solution), are set forth in accompanying Table No. 2.

TABLE NO. 2

| | Darcys |
|---|---|
| $K_w$ initial permeability | 8.27 |
| $K_w$ after injection of 50 cc. solution | 2.65 |
| $K_w$ after 2 pore vol. | 2.68 |

The observed reduction in water permeability is compared with two sand packs ($S_w$ 100%, temperature 100° F.) of the same characteristics. Two volumes of treating solution, 50 cc. each, containing 30 gm. of diphenyl phthalate per 50 cc. of solution, were injected into each sand pack. The results observed during these tests are set forth in accompanying Table No. 3.

TABLE NO. 3

| | | |
|---|---|---|
| $K_w$ initial permeability, darcys | 5.875 | 4.98 |
| $K_w$ after 1st injection, darcys | 2.91 | 2.55 |
| Amount of diphenyl phthalate remaining in cell, gm | 10.1 | 18.6 |
| $K_w$ after 2nd injection, darcys | 1.61 | 1.65 |
| Amount of diphenyl phthalate remaining in cell, gm | 13.1 | Not measured |
| Percent reduction in $K_w$, darcys | 72.5 | 66.7 |
| Total amount of diphenyl phthalate remaining in cell, gm | 23.1 | 18.6+ |

It was observed that the reduction in permeability to water with one injection of the three component mixture (crude oil-diphenyl phthalate-acetone) was equivalent to the reduction obtained when two injections of the diphenyl phthalate-acetone were employed even though the three component mixture contained 29% less solute.

*Example No. IV*

In a field trial 500 gal. of a saturated solution, diphenyl phthalate in acetone at a temperature of about 70° F., were introduced into an oil-producing formation which was producing an excessive amount of water relative to oil. It was observed that as a result of this treatment the amount of oil produced with respect to the produced water was substantially increased and that while the total fluid production from the treated well was substantially reduced the amount of oil produced, however, remained substantially unchanged.

As will be apparent to those skilled in the art many modifications, substitutions and alterations are possible in the practice of this invention without departing from the spirit or scope thereof.

We claim:
1. A method of treating an underground water-containing formation to alter the permeability and porosity thereof which comprises introducing into said formation a solution consisting essentially of diphenyl phthalate in an organic solvent selected from the group consisting of an aliphatic ketone and an aliphatic alcohol to contact the water therein to precipitate said diphenyl phthalate from said solution thereby altering the aforesaid characteristics of said formation.

2. A method in accordance with claim 1 wherein said solution is a saturated solution.

3. A method in accordance with claim 1 wherein the solvent for said diphenyl phthalate is acetone.

4. A method in accordance with claim 1 wherein said diphenyl phthalate solution is a saturated acetone solution of diphenyl phthalate.

5. A method in accordance with claim 1 wherein said solvent for diphenyl phthalate is an aliphatic ketone.

6. A method in accordance with claim 1 wherein said solution also contains crude oil dissolved therein.

References Cited in the file of this patent

UNITED STATES PATENTS

| | | |
|---|---|---|
| 2,032,826 | Ambrose et al. | Mar. 3, 1936 |
| 2,713,906 | Allen | July 26, 1955 |
| 2,747,671 | Nowak et al. | May 29, 1956 |
| 2,779,415 | Howard | Jan. 29, 1957 |

OTHER REFERENCES

Handbook of Chemistry and Physics, 36th edition, 1954–1955, Chemical Rubber Publishing Co., pages 1096–1097.

Plasticizers, by D. N. Buttrey, published by Cleaver-Hume Press Ltd. First publication 1950, page 20.

Technology of Solvents and Plasticizers, by Doolittle, published by John Wiley and Sons, Inc., published 1954, page 956.